Nov. 10, 1964                T. RUDDEROW                    3,156,108
                       MISSILE ATTITUDE POSITIONER
Filed Oct. 13, 1959                                    5 Sheets-Sheet 1

INVENTOR.
TRUMAN RUDDEROW
BY
Thomas S. MacDonald
ATTORNEY

INVENTOR.
TRUMAN RUDDEROW
BY
Thomas S. MacDonald
ATTORNEY

INVENTOR.
TRUMAN RUDDEROW

INVENTOR.
TRUMAN RUDDEROW

BY Thomas S. MacDonald

ATTORNEY

Nov. 10, 1964 T. RUDDEROW 3,156,108
MISSILE ATTITUDE POSITIONER
Filed Oct. 13, 1959 5 Sheets-Sheet 5

INVENTOR.
TRUMAN RUDDEROW
BY
ATTORNEY

United States Patent Office 3,156,108
Patented Nov. 10, 1964

3,156,108
MISSILE ATTITUDE POSITIONER
Truman Rudderow, Downey, Calif., assignor to
North American Aviation, Inc.
Filed Oct. 13, 1959, Ser. No. 846,156
12 Claims. (Cl. 73—1)

This invention relates to a missile testing and attitude positioner and more particularly to a missile testing attitude positioner which is able to support a missile while the engine is running and move it to various attitudes to simulate flight conditions to check the output of the components within the missile to determine if they are functioning correctly. The missile is uniquely positioned on the attitude positioner so that the center of gravity thereof is held in a relatively stationary position.

The inevitable trend of airborne vehicles to higher and higher speeds, subjecting them to severe operating conditions, has made it necessary to equip the vehicle with systems and components which are adapted to undergo severe operating conditions. Before the airborne vehicle is sent aloft, it is desirable to check the systems and components by positioning the vehicle in the various attitudes which it will be subjected to during a predetermined flight pattern.

Attempts have been made to perfect a missile test stand which is operatively simple while at the same time being low in cost; however, the prior art test stands are generally complex in construction and the cost relatively high. Further failings of the prior art test stands stem from vibrational and consequential torque type loads which are imparted to the test stand during the missile engine run-up.

The present invention overcomes the inadequacies of the prior art test stands by providing a test stand which is capable of expeditiously moving a missile located thereon around the three major axes of motion in order to check out a complete guidance system. The stand is uniquely designed so that the center of gravity of the missile is not moved during positioning which enables a relatively small unit to rapidly move the missile to the desired attitude. Such a construction permits relatively high missile engine run-ups while providing a positive check on the destructive loads imparted to the test stand.

The principal object of this invention is to provide a novel missile test stand which is designed so that the center of gravity of the missile is held in a relatively stationary position during rapid changes in the attitude thereof.

Another object of this invention is to provide a missile testing and attitude positioner with novel independent drive means for positioning a missile being checked out, about the three major axes of motion.

Still another object of this invention is to provide a control console which will automatically position the missile in various predetermined test attitudes.

The missile attitude positioner of the present invention comprises a base rotatably mounted on a stationary center post in a horizontal plane adapted to be rotated by novel drive means. A pitch base is tiltably mounted on the rotatable base and is adapted to be tilted in a first vertical plane by further novel drive means. A roll base is tiltably mounted on the pitch base and is adapted to be tilted in a second vertical ninety degrees out of phase with the plane in which the pitch base is tilted. Novel drive means identical with the drive means actuating the tilting movements of the pitch base are utilized to tilt the roll base.

Figure 1:
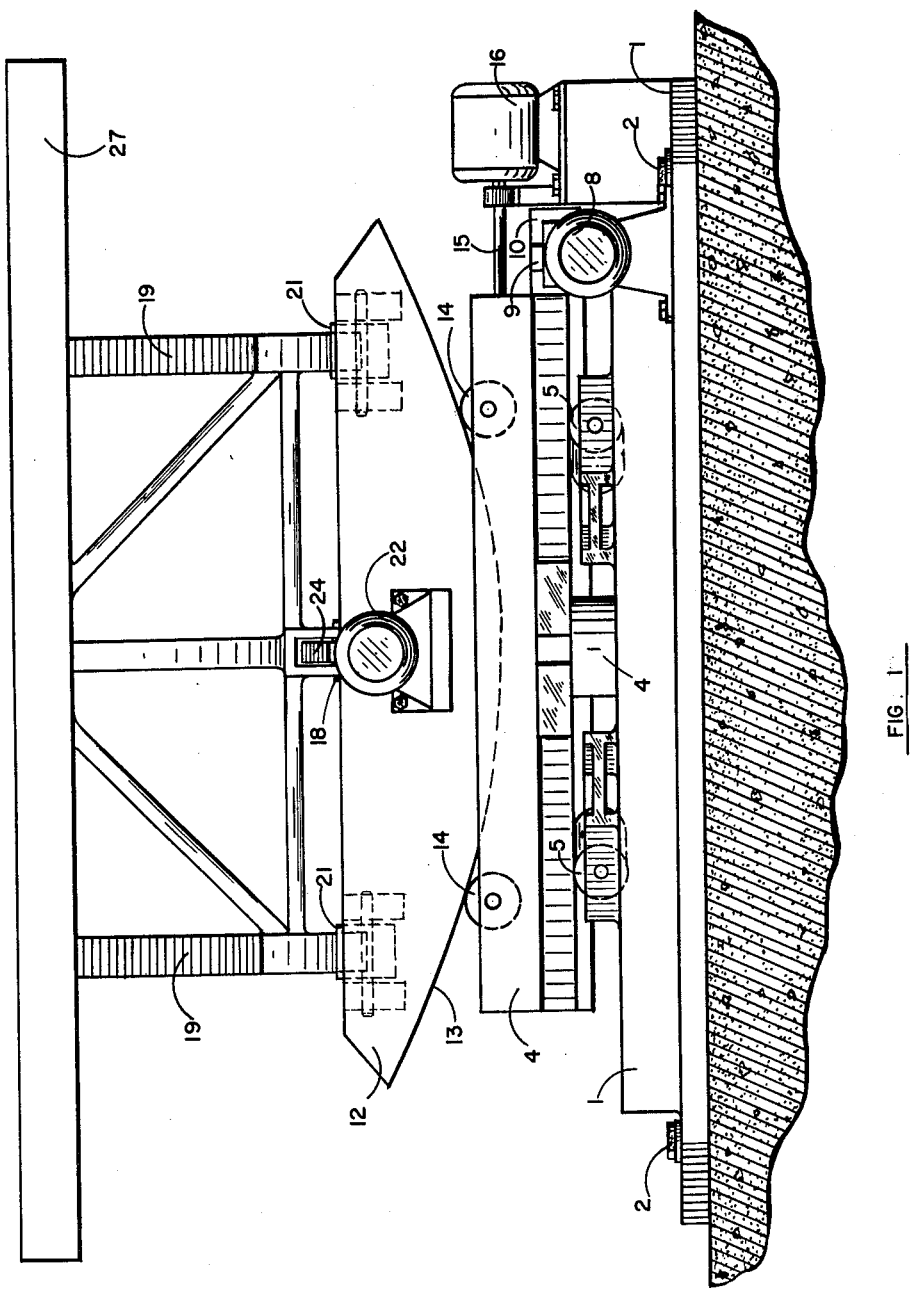
FIG. 1 shows a side view of the missile attitude positioner.

The missile testing and attitude positioner is shown in FIG. 1, wherein a stationary base 1 is fixedly mounted on a floor by bolts 2. A cylindrical center post 3 extends perpendicularly from the stationary base and a horizontal swivel base 4 is mounted thereon.

Figure 5:
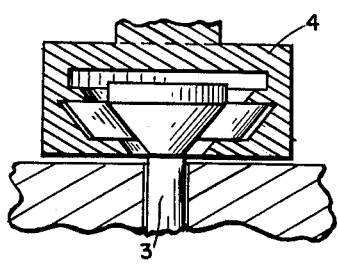
FIG. 5 is a cross-sectional view showing the manner in which the swivel base is mounted on the floor.

FIG. 5 discloses one specific manner of mounting the swivel base 4 on post 3. Due to this arrangement, the upward movements of the swivel base resulting from the forces imparted thereto due to the running of the rocket motors will be effectively resisted. Rollers 5 are radially positioned and rotatably mounted on stationary base 1 to support swivel base 4 and permit the rotation thereof.

Figure 2:
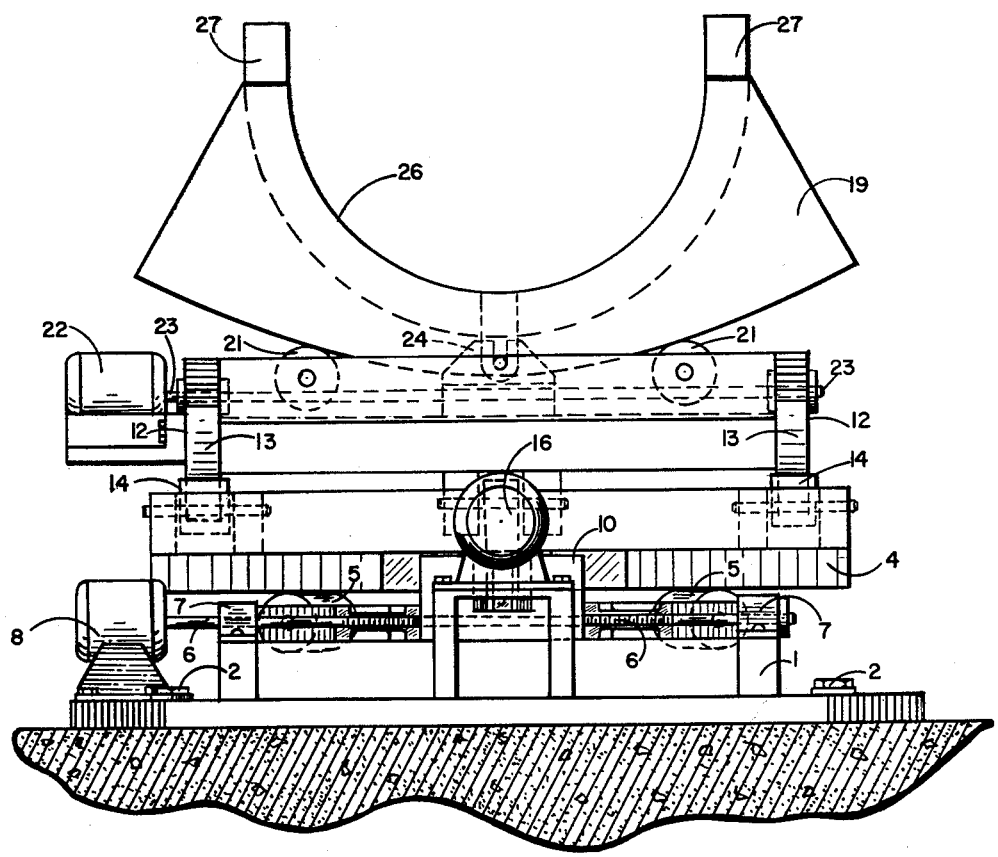
FIG. 2 shows a right hand end view of the missile attitude positioner of FIG. 1.
Figure 3:
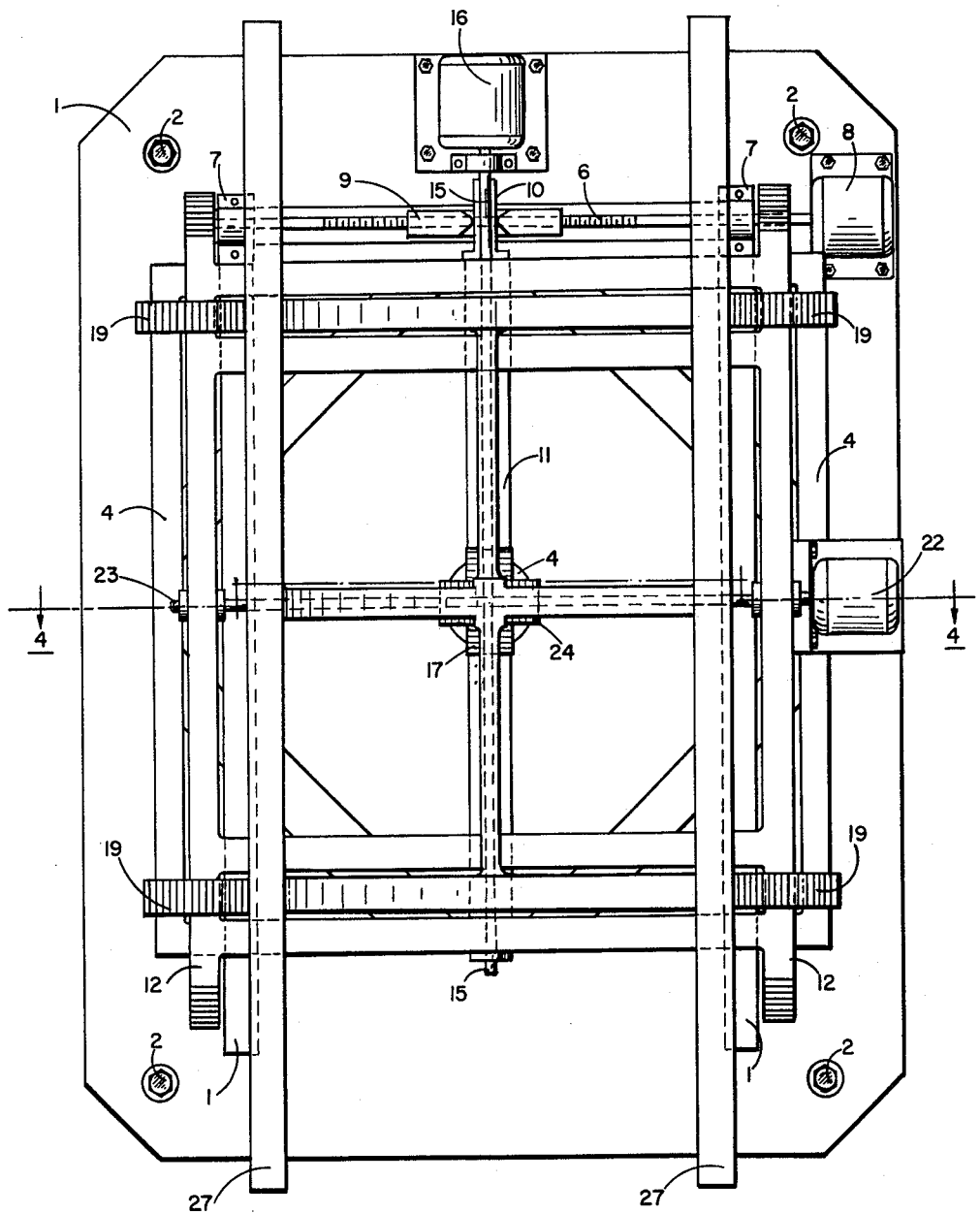
FIG. 3 shows a top view of the missile attitude positioner of FIG. 1.

A first drive screw 6 is mounted on the stationary base 3 in bearings 7, as shown in FIGS. 2 and 3. A reversible motor 8 is also mounted on the stationary base to selectively revolve the drive screw 6. A shifting fork 9 having internal threads (not shown) cooperating with the threaded drive screw 6 is adapted to be selectively longitudinally actuated thereby. The fork portion of the shifting fork 9 is slidably connected with extended portion 10 of support beam 11 which beam is integrally connected with the swivel base 4.

It is apparent that upon the turning of drive screw 6 the fork member 9 will be longitudinally actuated and carry the beam 11 and swivel base 4 therewith. Consequently, the swivel base 4 will be rotated on rollers 5 about the center post member 3. A clearance is provided between portion 10 of the supporting beam and the fork 9 to permit such rotation as shown in FIG. 3.

Although the specific illustrated construction limits the rotation of swivel base 4 to approximately 10 to 15°, it is to be understood that different drive mechanisms such as a worm gear and complementary gear means on the base 4 may be employed to rotate the base up to and including 360°.

Figure 4:
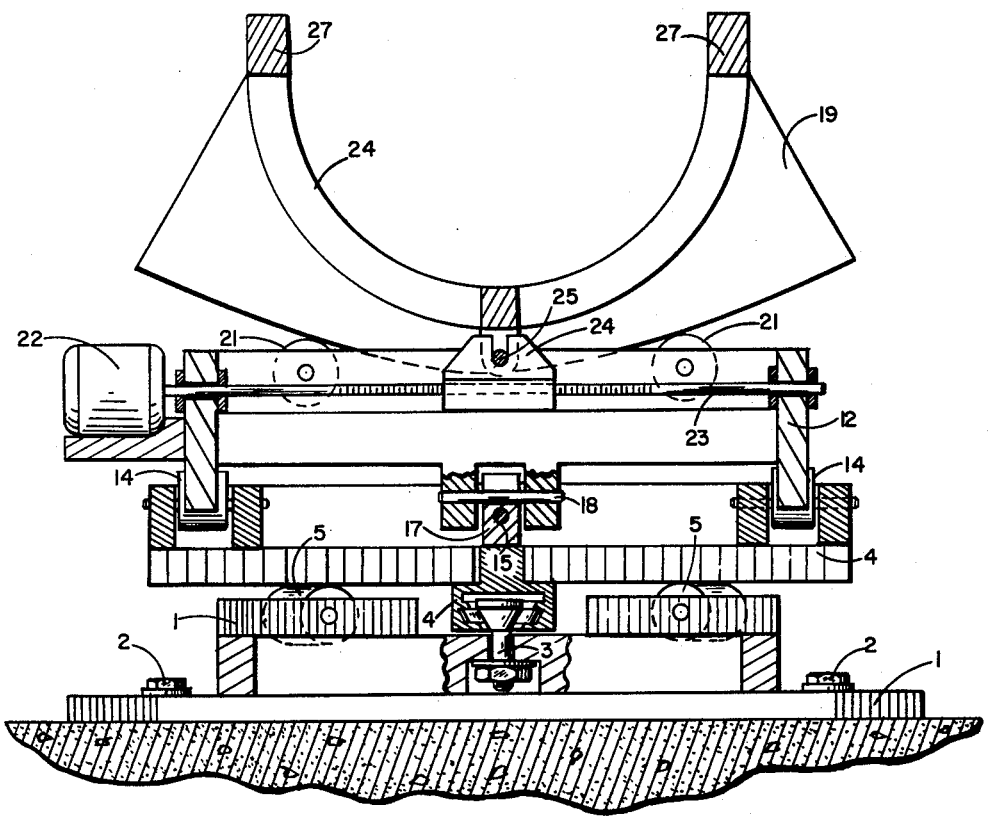
FIG. 4 is a cross-sectional view taken on lines 4—4 of FIG. 3.

A pitch base 12 having curved tracks 13 is mounted on rollers 14 which rollers are rotatably mounted on swivel base 4. A second drive screw 15, similar in construction to the first drive screw 6, is mounted in bearings on the swivel base 4 and is adapted to be rotated by reversible motor 16. A shifting fork member 17, FIG. 4, having internal threads cooperating with the threads of drive screw 15 functions similar to fork 9. The slot of the fork member 17 cooperates with a transverse rod 18 fixedly mounted to the pitch base 12 for the actuation thereof.

Upon selective actuation of the reversible motor 16, the fork member 17 will carry the rod 18 in either direction, thus pivoting and moving the pitch base 12 on the rollers 14 in a plane vertical to the horizontal plane of the swivel base 4. The vertical movements of rod 18 constitutes lost motion since the pivoting of the pitch base is solely determined by the horizontal movements of the rod.

A roll base 19 having curved tracks 20 mounted on rollers 21 is identical in structure to the curved track 13 and rollers 14 mounting the pitch base and is adapted to be actuated in a manner similar thereto. Rollers 21 are rotatably mounted on the pitch base 12 and the curve tracks 20 of the roll base 19 are adapted to cooperate therewith to revolve the roll base in a plane perpendicular to that in which pitch base 12 is revolved. Reversible motor 22, mounted on the pitch base 12, is similar in construction to motors 8 and 16 and selectively revolves a third drive screw 23 which is mounted in bearings on the roll base 19.

The construction of the above described roll base actuating means is identical with the construction of the actuating means of the pitch base. A fork member 24 cooperates with the rod 25 fixed to the roll base and upon turning of the third drive screw 23, the roll base will be revolved in the second vertical plane.

With the aforedescribed unique construction, the missile may be moved into any desired attitude, thus simulating the precise predetermined flight conditions.

The roll base 19 is constructed with a cradle or seat 26 on which the missile is placed before the testing thereof. The two beams 27 are used to position the grappling hooks or other utilized means for lowering the missile into test position.

Figure 6:
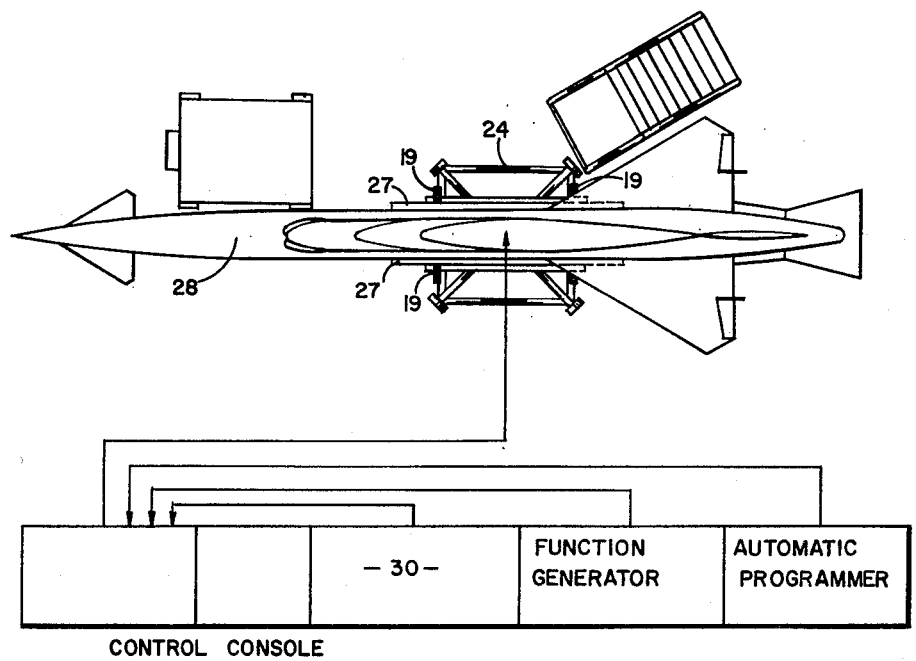
FIG. 6 is a schematic floor plan view showing a missile test system with the missile in test position on the missile attitude positioner.

From the above construction and with particular attention to FIG. 6, it is noted that there are three major axes about which the missile may be revolved, (1) the vertical axis A about which the swivel base 4 is revolved, (2) the horizontal axis B about which pitch base 12 is revolved and, (3) the horizontal axis C about which the roll base 19 is revolved. In the preferred embodiment, the attitude positioner is constructed so that the three major axes of rotation intersect the center of gravity of the device being tested.

Figure 7:
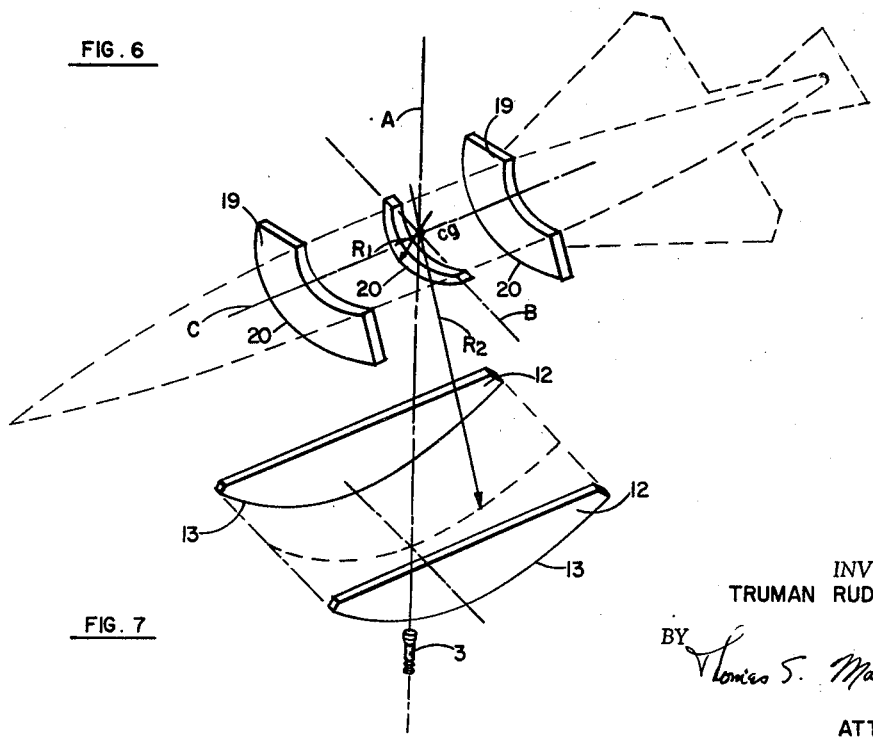
FIG. 7 shows the relative positioning of the center of gravity of the missile on the missile attitude positioner.

As clearly shown in FIG. 7, the attitude positioner is structurally unique in that the center of gravity of the missile determines the radius of the curvature ($R_1$) of the curved track 20 of the roll base 19, the radius of curvature ($R_2$) of curved track 13 of the pitch base 12 and is placed directly over the bearing center post 3 extending upwardly from the stationary base 1. With such a construction, the missile may be selectively tilted about axes A, B and C to thus attain any desired attitude while maintaining the center of gravity of the missile in the same relative position.

When missiles of varied diameter are used, shims may be placed in the cradle 26 of the roll base 19 to thus effectively position the center of gravity thereof.

With the above described novel construction, it is apparent that the missile test stand may be of a relatively lighter construction, thus making it possible to dispense with the heavy and cumbersome type of test stands which are now used.

FIG. 5 schematically shows a missile 28 placed in test position on a missile attitude positioner 29. The independent reversible drive motors 8, 16 and 22 of the positioner 29 are electrically and operatively connected to a flight attitude positioning control console 30. The motors are so connected to the console that the relative speeds between the motors can be selectively actuated to position the missile about axis A, B and C (FIG. 7).

The control console 30 may be manually controlled by manual inputs thereto, but also includes an automatic programmer and function generator adapted to relay prerecorded signals to the motors 8, 16 and 22 to thus position the missile 28 into its various predetermined flight attitudes. A detailed description of the automatic programmer can be found in the application to Topp et al., Serial No. 761,107, entitled Automatic Function Test Equipment, filed September 15, 1958.

Operation

When a missile flight pattern has been theoretically determined, that is, the periodic changing of directions thereof has been calculated, a dictate tape or punch card is recorded and operatively connected to the automatic programmer of the control console 30. The automatic programmer in turn feeds the signals to the function generator, also included in the control console 30, which signals are transmitted to the reversible motors 8, 16 and 22 to independently control the speed and direction of rotation thereof. From such a construction, it is apparent that the missile 32 will be selectively revolved about axes A, B and C (FIG. 7) and the attitude of the missile will change in accordance with the dictating tape or card, to thus follow the predetermined attitude changes.

Although the movements of the swivel base 4, pitch base 12 and roll base 19 are shown as being restricted to a predetermined angle, as limited by the operative drive screw connections, it is obvious that the drive connections may be modified to pivot the three bases to a greater amount if so desired. The above construction shows only the approximate degree of freedom of movement necessary for present day testing applications.

Although certain embodiments of the invention have been set forth, it will become apparent that various changes and modifications may be made in the construction and arrangement of the various parts without departing from the scope of this novel concept.

I claim:

1. A missile testing and attitude positioner comprising: a base means lying in a horizontal position and rotatably mounted on swivel means adapted to rotate said base means; first drive means operatively connected to said swivel means and adapted to be actuated to selectively rotate said base means; pitch base means vertically and tiltably mounted on said base means; second drive means operatively connected to said pitch base means for selectively tilting said pitch base means in a first direction; roll base means vertically and tiltably mounted on said pitch base means and substantially constructed and arranged prependicularly thereto, said roll base means adapted to hold and tilt a missile; third drive means operatively connected to said roll base means for selectively tilting said roll base means in a second direction which is substantially perpendicular to said first direction wherein the axes of rotation of said base means, said pitch base means and said roll base means all pass through the center of gravity of a missile supported on said positioner.

2. The missile testing and attitude positioner of claim 1 wherein: a first curved track means mounts said pitch base means on said swivel base means and second curved track means mounts said roll base means on said pitch base means, the first and second curved track means so positioned and cooperative to hold the center of gravity of a missile in the same relative position during attitude changes thereof.

3. The missile testing and attitude positioner of claim 1 further including a control console means operatively connected to the first, second, and third drive means adapted to selectively position a missile to any desired attitude, to thus simulate a predetermined flight pattern.

4. The missile testing and attitude positioner of claim 3 wherein the control console means includes program means and function generator means, said program means adapted to automatically relay signals simulating a predetermined recorded attiude pattern to said function generator means and said function generator means adapted to relay said signals to said first, second and third drive means.

5. A testing and attitude positioner for a device to be tested comprising: a stationary vertical post member, the vertical axis of which is adapted to pass through the center of gravity of a test device; a swivel base mounted on said vertical post member lying in a horizontal plane and adapted to rotate therein; a pitch base having a first curved track mounted on a first tilting means on said horizontal swivel base and cooperating therewith for tilting movement of said pitch base; an arc defining the curved track adapted to be an equal distance at all points from the center of gravity of a device to be tested; a roll base having cradle means adapted to hold a device to be tested; a second curved track on said roll base and mounted on a second tilting means on said pitch base and cooperating therewith for tilting movement of said roll base; an arc defining the second curved track adapted to be an equal distance at all points from the center of gravity of a device to be tested.

6. The testing and attitude positioner for a device to be tested of claim 5 wherein the arc defining the first curved track lies in a first plane vertical to said horizontal plane and the arc defining the second curved track lies in a second plane vertical to said horizontal plane but different than said first vertical plane.

7. The testing and attitude positioner for a device to be tested of claim 6 further comprising: a first drive means to rotate said swivel base in said horizontal plane; a second drive means to tilt said pitch base in said first vertical plane and; third drive means to tilt said roll base in said second vertical plane.

8. The missile testing and attitude positioner for a device to be tested of claim 7 further comprising a control console means operatively connected to the first, second, and third drive means adapted to selectively position a missile in the desired attitude of the horizontal plane and said first and second vertical planes, thus simulating a predetermined flight pattern.

9. The missile testing and attitude positioner of claim 8 wherein the control console means includes program means and function generator means, said program means adapted to automatically relay signals simulating a predetermined recorded attitude pattern to said function generator means and said function generator means adapted to relay said signals to said first, second and third drive means.

10. The missile testing and attitude positioner of claim 2 wherein both the first and second curved track means each comprise a skeletal structure of two substantially parallel curved tracks rigidly interconnected.

11. The missile testing and attitude positioner of claim 10 wherein the first and second curved track means are mounted on rollers.

12. The missile testing and attitude positioner of claim 7 wherein said first drive means comprises a threaded lead screw, reversible motor means for driving said screw and a shifting fork nut cooperating with said screw and with said base for positioning said base, said second drive means comprising a threaded lead screw, reversible motor means for driving said screw and a shifting fork nut cooperating with said screw and with said pitch base for positioning said pitch base, said third drive means comprising a threaded lead screw, a reversible motor means for driving said screw and a shifting fork nut cooperating with said screw and with said roll base for positioning said roll base.

References Cited in the file of this patent
UNITED STATES PATENTS

| | | |
|---|---|---|
| 1,292,235 | Beckett | Jan. 21, 1919 |
| 1,394,912 | Korkosz | Oct. 25, 1921 |
| 1,560,435 | Sperry | Nov. 3, 1925 |
| 2,301,967 | Nosker et al. | Nov. 17, 1942 |
| 2,761,306 | McNutt | Sept. 4, 1956 |